United States Patent [19]

Campbell

[11] Patent Number: 4,517,212
[45] Date of Patent: May 14, 1985

[54] METHOD OF DISPENSING DOUGH

[75] Inventor: Sterrett P. Campbell, Norcross, Ga.

[73] Assignee: AMF Incorporated, White Plains, N.Y.

[21] Appl. No.: 571,999

[22] Filed: Jan. 19, 1984

Related U.S. Application Data

[60] Division of Ser. No. 257,261, Apr. 6, 1981, Pat. No. 4,449,908, which is a continuation-in-part of Ser. No. 58,120, Jul. 16, 1979, abandoned.

[51] Int. Cl.³ .............................................. A21D 6/00
[52] U.S. Cl. ...................................... 426/496; 426/503
[58] Field of Search ...................... 426/496, 503, 504; 425/204, 208; 366/85, 86, 323

[56] References Cited

U.S. PATENT DOCUMENTS

| | | | |
|---|---|---|---|
| 1,944,464 | 1/1934 | Richardson | 425/142 |
| 2,099,119 | 11/1937 | King et al. | 425/164 |
| 2,231,357 | 2/1941 | Burghauser et al. | 366/85 |
| 2,434,707 | 1/1948 | Marshall | 264/349 |
| 2,615,199 | 10/1952 | Fuller | 425/204 |
| 2,642,643 | 6/1953 | Montague | 425/376 R |
| 3,203,370 | 8/1965 | Haus et al. | 366/85 |
| 3,225,715 | 12/1965 | Page | 425/204 |
| 3,927,611 | 12/1975 | Papalexis | 99/472 |

FOREIGN PATENT DOCUMENTS 207170  2/1968  U.S.S.R. ............................ 366/85

Primary Examiner—George Yeung
Attorney, Agent, or Firm—Thomas & Kennedy

[57] ABSTRACT

Dough is dispensed from the bottom of a dough hopper with a screw conveyor that slices into the dough mass and moves the dough horizontally out of a lower opening in the hopper and through a discharge conduit and discharge nozzle. The screw conveyor divides the conveyed dough into batches and the dough is worked in the discharge conduit and air from about the batches of dough is vented from the discharge conduit prior to extruding the dough through the discharge nozzle.

5 Claims, 8 Drawing Figures

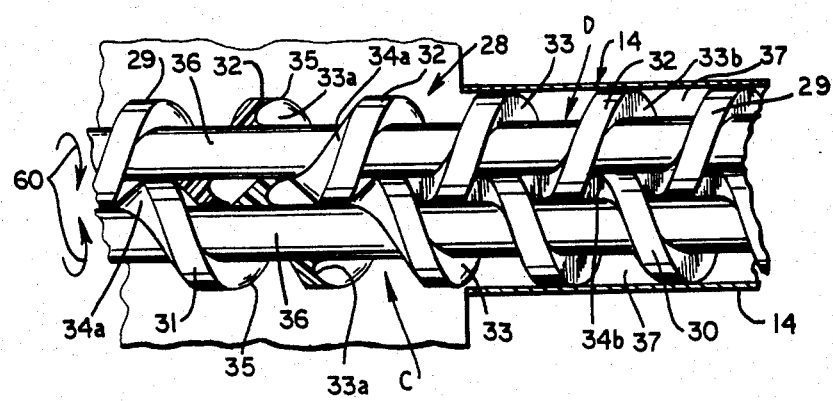
FIG_3
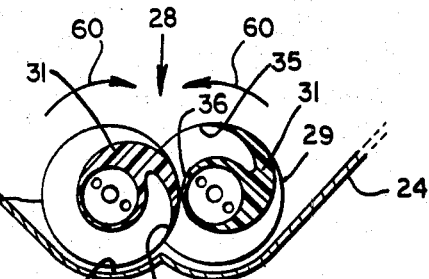
FIG_4
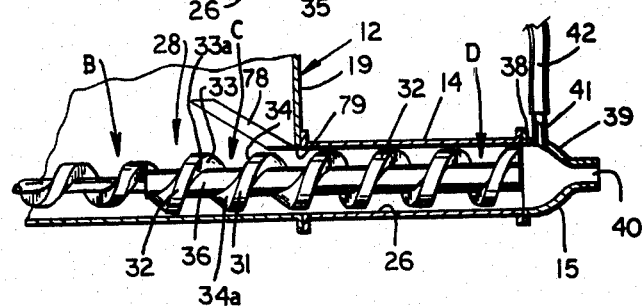
FIG_5
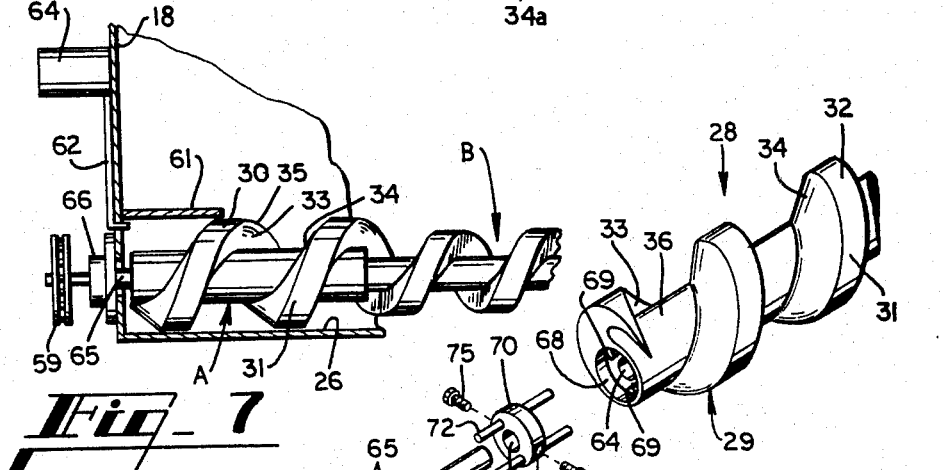
FIG_7
FIG_6

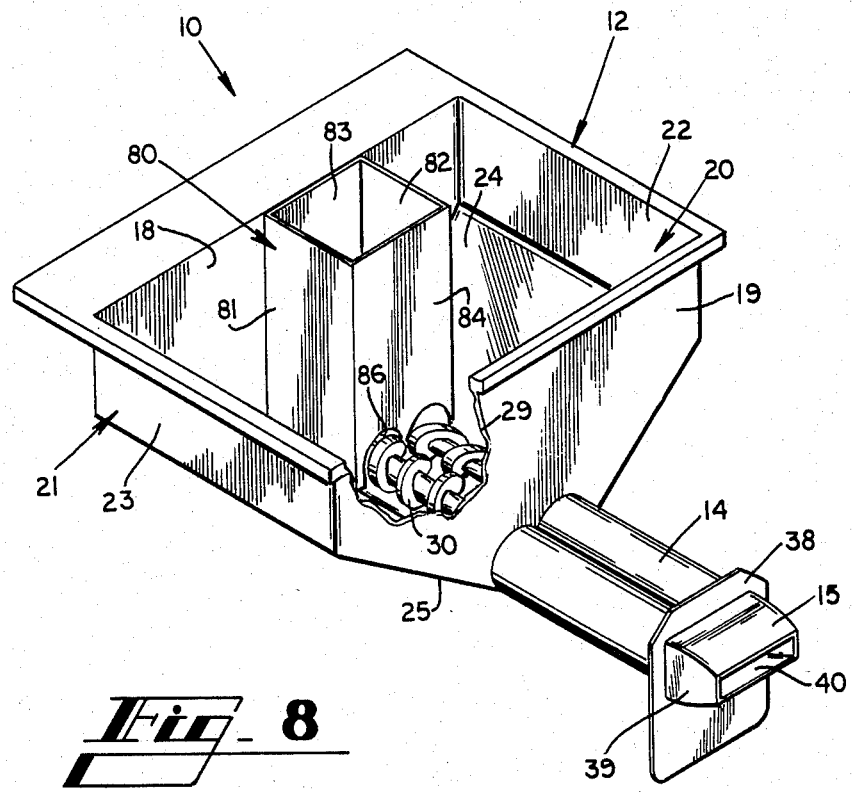

METHOD OF DISPENSING DOUGH

CROSS REFERENCE TO RELATED APPLICATION

This application is a division, of application Ser. No. 251,261, filed Apr. 6, 1981, now U.S. Pat. No. 4,449,908, issued May 22, 1984; which is a continuation-in-part of application Ser. No. 058,120, filed July 16, 1979, abandoned.

TECHNICAL FIELD

The invention disclosed herein relates to a method and apparatus for dispensing dough and the like which is received in a batch from a mixer and which is to be transported in smaller quantities to a subsequent work station such as to a dough divider of the type used to form the dough into biscuits.

DESCRIPTION OF PRIOR ART

When dough is mixed it is usually blended in a large mixer, and the batch of dough in the mixer must be transported to another location where the batch is divided into smaller parts such as into biscuits, loaves, buns, etc. When a batch of dough is transported from the mixer to one of the several dough dividers in a typical manufacturing plant, the entire batch from the mixer usually is dumped into a transport vehicle, the transport vehicle is moved to the divider apparatus, and all or a portion of the batch is dumped into a hopper that feeds the divider apparatus. The dividing process usually is carefully performed so that each biscuit, bun, etc. divided from the mass of dough is of consistent weight so that when the product is subsequently baked or otherwise cooked, packaged and delivered, each of the products will be of substantially uniform size, weight and density. Prior art apparatus are illustrated in U.S. Pat. Nos. 2,858,775 and 3,941,538.

When dough has been mixed and is waiting to be divided into smaller biscuits, buns, etc., the dough tends to rise so that it becomes less dense and occupies a larger volume per unit of weight. Thus, the last portion of a batch of dough that is waiting to be divided is likely to be less dense than the first portion. Since the equipment used for dividing dough functions to divide the dough into uniform volumes, the dividing equipment will continue to form the biscuits, buns, etc. with the same volume but with less weight of dough as the dough from the batch rises, causing the subsequent products to be different from those products made from the first dough taken from the batch. As this happens, the dough divider operator usually attempts to compensate for the less dense dough by adjusting the divider to cause the biscuits, buns, etc. to be formed in larger volumes but of the same weight.

SUMMARY OF THE INVENTION

Briefly described, the present invention comprises a dough dispensing system wherein a batch of dough and the like is received from a dough mixer in a hopper and the dough is progressively dispensed from the batch or mass of dough to a subsequent work station such as to a dough divider. The dough is worked as it is dispensed and the gases emanating from the dough are removed from the dough as the dough is worked, thereby maintaining and restoring the dough approximately to its original density as when received from the dough mixer.

A screw conveyor comprising a pair of interference helical screw conveyor elements is located at the bottom of a hopper which receives the batch of dough from the dough mixer, and the screw conveyor is shaped so as to slice the dough from the mass of dough in the hopper, substantially without tearing the dough, and to transport the dough through a discharge conduit. The helical conveyor elements are formed in the discharge conduit so as to positively displace the dough through the discharge conduit and to divide the dough into small batches which are individually worked and degased as they are moved through the discharge conduit to the discharge nozzle. The discharge nozzle creates back pressure in the discharge conduit, causing a substantial portion of the gases about the batches of dough in the screw conveyor to be vented through a small vent port to the atmosphere, so that the dough being discharged from the nozzle is of a consistency and density approximately the same as when discharged from the dough mixer.

The screw conveyor at the bottom of the hopper tends to fill its cavities at the rear of the batch of dough and the dough is moved in the cavities across the bottom of the batch to the discharge conduit. This results in the dough being fed first from the rear of the batch through a tunnel formed beneath the rest of the batch.

In some instances it is desirable to progressively add an additional substance to the batch of fresh dough in the hopper and to blend the added substance with the dough in the hopper. An example of this is when it is desirable to add to the fresh dough the scrap dough from a dough shaping process in which dough extruded from the hopper is formed in a desired shape by cutting away some of the dough. The scrap dough from the dough shaping process is fed to the rear of the screw conveyor elements so that it immediately enters the screw conveyor. As the scrap dough moves with the screw conveyor beneath the fresh dough, the fresh dough fills in the remaining open space in the screw conveyor.

Thus, it is an object of this invention to provide a dispensing system for baker's dough and the like which maintains and restores the dough to a known and desired density, which degases the dough and which progressively dispenses the dough to a subsequent processing station such as to a dough divider.

Another object of this invention is to provide a dough pump method and apparatus which is inexpensive to construct and to maintain and which dispenses dough on a progressive basis from a large mass of dough at a desired density.

Another object of this invention is to provide a dough pump method and apparatus wherein the dough is sliced from a large mass of dough, worked, degased and dispensed at a desired density.

Another object of this invention is to provide a dough dispensing system which blends fresh dough with an additive such as scrap dough and which dispenses the combination at a desired density.

Other objects, features and advantages of the present invention will become apparent upon reading the following specification, when taken in conjunction with the accompanying drawing.

BRIEF DESCRIPTION OF THE DRAWING

FIG. 3 is a top view of the screw conveyor, showing a portion of the screw conveyor that extends through the bottom of the hopper and the portion of the screw conveyor that extends through the discharge conduit.

FIG. 4 is a detail end view of the screw conveyor in the lower portion of the hopper.

FIG. 5 is a side cross-sectional view of a portion of the screw conveyor, showing a portion of the hopper and the discharge conduit.

FIG. 6 is an exploded perspective illustration of a portion of the screw conveyor, showing the manner in which the elements of the screw conveyor are connected together.

FIG. 7 is a detail side cross-sectional view of the hopper showing the screw conveyor and the vent pump.

FIG. 8 is a partial perspective illustration of the dough pump hopper, showing the scrap chute mounted over the screw conveyor at the rear of the hopper.

DETAILED DESCRIPTION

Figure 1:
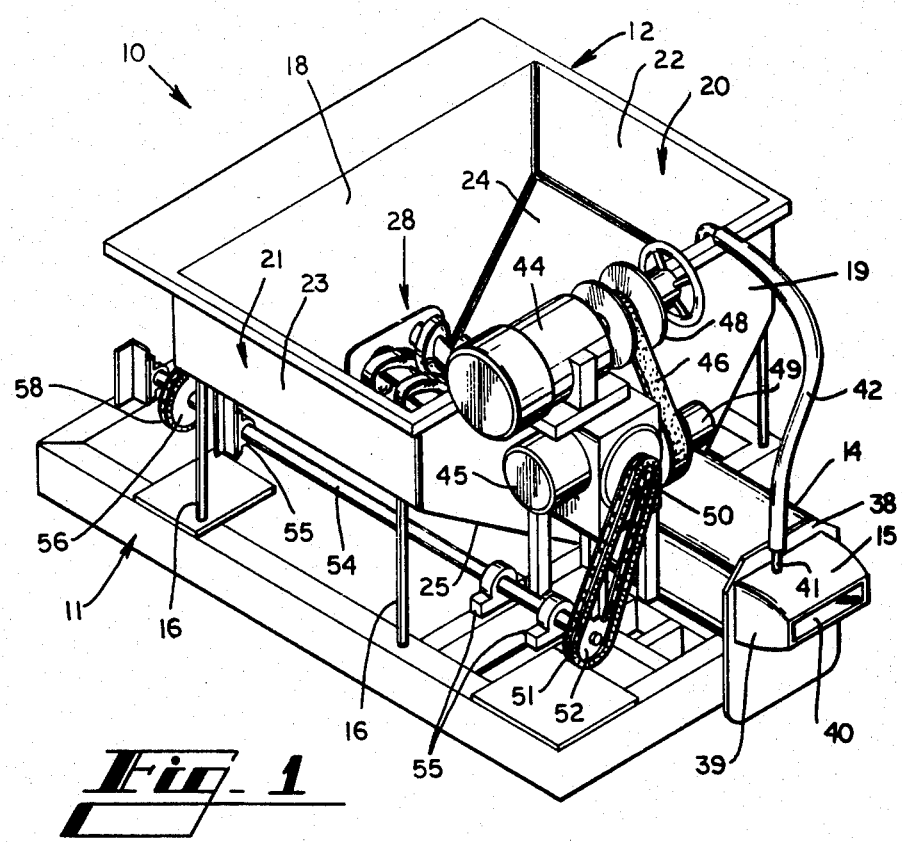
FIG. 1 is a perspective illustration of the dough pump.
Figure 2:
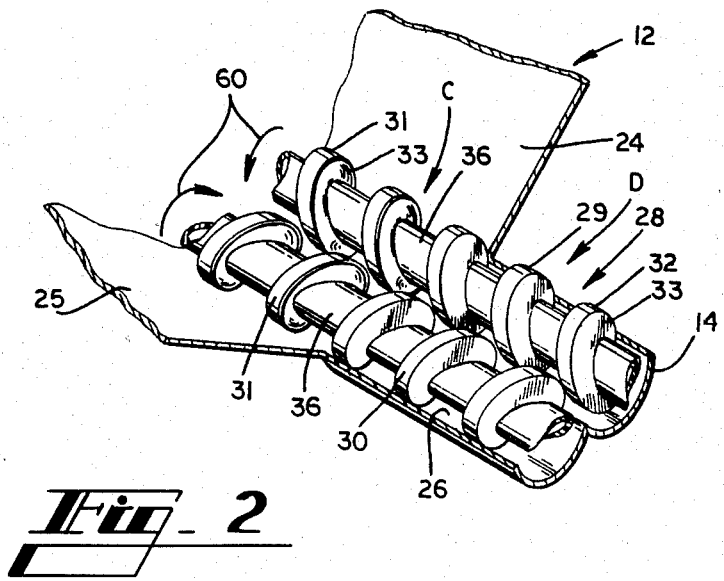
FIG. 2 is a detail perspective illustration of the screw conveyor of the dough pump.

Referring now in more detail to the drawings, in which like numerals indicate like parts throughout the several views, FIG. 1 illustrates dough pump 10 which is usually placed beneath a dough mixer (not shown) and which dispenses dough for delivery to a subsequent work station, such as to a dough divider (not shown). For example, the dough pump can dispense directly to a subsequent piece of equipment or can dispense to a conveyor belt or to a movable container for transporting the dough to a dough divider, etc. Dough pump 10 includes support framework 11, hopper 12, discharge conduit 14 and discharge nozzle 15. Hopper 12 is mounted on framework 11 by suitable support legs 16 and comprises end walls 18 and 19 and side walls 20 and 21. While end walls 18 and 19 are vertical, side walls 20 and 21 are vertical in their upper portions 22 and 23 and converge downwardly toward each other in their lower portions 24 and 25, and in their lowermost portions form a horizontal double recessed channel 26 that functions as a conveyor cradle (FIG. 2).

Screw conveyor 28 is positioned in conveyor cradle 26 and extends horizontally along the lower portion of hopper 12 and into discharge conduit 14. Screw conveyor 28 comprises a pair of oppositely threaded helical interference screw elements 29 and 30 placed in side-by-side, parallel relationship, with each element 29 and 30 placed in a channel of the conveyor cradle 26. The screw conveyor comprises four longitudinal phases. The first phase A (FIG. 7) located at the back wall of the hopper, the second or small diameter phase B located in the middle portion of the hopper, the third phase C (FIG. 5) located at the front wall of the hopper, and the fourth or discharge phase D extending through the discharge conduit 14. The helical screw elements 29 and 30 in each phase define a rectilinear cylindrical shaft 36 and helical thread or ribbon 31 extending thereabout and along its length. The thread 31 of each helical screw 29 and 30 defines a peripheral portion 32, a conveying surface 33 and a following surface 34. The peripheral portion 32 of phases A, C and D are approximately of uniform diameter on both screw elements. The peripheral portion 32 of phase B is smaller than the peripheral portions of phases A, C and D. The segment of each of the helical screw elements 29 and 30 which extends along the bottom of hopper 12 in phases B and C have a concave conveying surface 33a and a sloped following surface 34a (FIG. 3), with the concave surface 33a intersecting its peripheral portion 32 at a sharp acute angle 35, preferably less than a 45° angle with the acute angle 35 of each screw element forming a continuous spiral knife edge along the bottom of hopper 12. The sloped following surface 34a forms obtuse angles with respect to shaft 36 and with respect to peripheral portion 32. The pitch of the screws in the hopper is six inches, while the pitch of the screws extending through discharge conduit 14 is four inches. The larger pitch of the screws in phases B and C assures that the conveying pockets formed by the screws in phase D are filled with dough during operation of the dough pump.

The segments of each of the helical screw elements 29 and 30 which extend through the first phase A adjacent the back wall of the hopper and the fourth phase D in the discharge conduit 14 are Acme screws and have both their conveying surfaces 33b and following surfaces 34b formed at right angles with respect to shaft 36 and the space 37 between the threads 31 of each screw element and the thickness of each thread 31 are substantially equal so that the interference fit made between the thread of one screw element is snug in the space between the thread of the other element. The screws in phase D form isolated conveying pockets so as to maintain the dough in the moving pockets and positively convey the dough. The discharge conduit 14 (FIG. 5) and the dough shield 61 (FIG. 7) adjacent the back wall of the hopper both have internal surfaces that conform to the shape and size of the peripheral portion 32 of each of the threads. Thus, the shape of the threads in the discharge conduit 14 together with the conforming shape of the internal surface of the discharge conduit 14 and in the dough shield 61 cause the screw elements 29 and 30 in phases A and D to be positive displacement screw elements and the clearance between the screws in phase D and between the discharge conduit 14 and the screws extending through the discharge conduit is small enough to prevent the relatively thick dough from passing between these elements, while the clearance will permit gas to pass between these elements. By contrast, the portions of the screw elements 29 and 30 that are located in the open bottom of hopper 12 are not in a positive displacement configuration. Thus, the portions of screw elements 29 and 30 that are located in the open bottom of hopper 12 function as a first screw conveyor and the portions of screw elements 29 and 30 that extend through discharge conduit 14 function as a second screw conveyor.

The discharge nozzle 15 is mounted on the end of discharge conduit 14 and comprises mounting plate 38, funnel portion 39 and discharge opening 40. A small vent opening 41 is formed in discharge nozzle 15 at the end of screw conveyor 28 and upstream from discharge opening 40 and conduit 42 extends from vent opening 41 back into the open hopper 12. Discharge opening 40 is of smaller cross-sectional area than the internal cross-sectional area of discharge conduit 14, and the funnel portion 39. The vent opening 41 is small enough to avoid the passage of much dough therethrough even though the dough is under pressure at this position in the discharge conduit, but gas can pass through the vent to exhaust gas bubbles from the moving dough.

Drive motor 44 is mounted on framework 11 over gear reducer 45 and drive motor 44 is connected by V-belt 46 and the variable sheave drive assembly 48, 49 to reducer 45. The output shaft of the reducer 45 is connected to drive sprocket 50, and sprocket 50 is connected through drive chain 51 to the sprocket 52 of jack shaft 54. Jack shaft 54 is supported in bearings 55 and extends the length of hopper 12 to the rear of the hopper where its sprocket 56 is connected to drive chain 58. Drive chain 58 is connected to the sprockets 59 at the ends of screw elements 29 and 30 in an under and over relationship so that the screw elements rotate in opposite directions of rotation, with their upper surfaces moving downwardly toward the opposite screw element, as illustrated by the arrows 60.

Dough shield 61 is attached to end wall 18 (FIG. 7) over the space occupied by screw elements 29 and 30, and extends along the length of the screw elements for a short distance away from end wall 18. Air conduit 62 extends through end wall 18, and one end of air conduit 62 communicates with the area confined by dough shield 61. The other end of air conduit 62 communicates with the inlet of air compressor 64, so that air compressor 64 extracts air from beneath dough shield 61, to evacuate the air from about the helical screw elements 29 and 30, thus inducing the mass of dough in hopper 12 to merge with the screw conveyor 28. Since phase A of the screw conveyor is a positive displacement phase with respect to the dough, the conveyor prevents the dough from being sucked into the air conduit 62. As the conveyor screws turn, gas that has developed in the dough is continuously released. If the hopper is full of dough, the gas from the dough tends to form a cloud around the screws and tends to displace or lift the dough from about the screws. If this should happen the delivery rate of the pump is reduced. By venting the gas from under shield 61 the gas is exhausted as it is developed. When the dough covers the rear portions of the screws and the shield, the evacuation of the gas beneath the shield tends to draw the dough with a negative pressure into the screws. Since the upper portions of the conveyor screws move toward each other and since the screws have an interference fit, the dough is conveyed along the hopper primarily along the upper and outer surfaces of the screws in the hopper, while the lower portions of the screws in the hopper may not be filled with dough. Therefore, the suction of air from beneath shield 61 tends to form negative pressure along the lower portions of the screws in the hopper, thus tending to remove the gas from about the screws and tending to induce the dough to fill the conveying pockets formed by the screws. This results in a more even flow which is desirable when consistant extrusion is required.

As illustrated in FIG. 6, screw conveyor elements 29 and 30 are formed in relatively short segments, and the shaft 36 of each segment of each screw element 29 and 30 is hollow and defines through opening 64. An elongated drive shaft 65 extends through the central axial opening 64 of each segment of the screw elements 29 and 30, and the drive shafts protrude through end wall 18 and their bearings 66 and have drive sprockets 59 mounted thereon. Each segment of each screw element 29 and 30 includes recesses 68 at each of its ends and blind bores 69 extending axially into the shaft portion 36 of the screw elements. Collars 70 define central openings 71 therethrough, and the collars are mounted on the drive shaft 65 between each screw segment. Drive pins 72 are rigidly mounted to collars 70 and extend axially with respect thereto, and the drive pins 72 extend into the blind bores 69. Collars 70 also include internally threaded radially extending set screw openings 74, and set screws 75 are threaded through the opening 74 into engagement with drive shaft 65, to rigidly mount the collar 70 to the drive shaft. With this arrangement, the drive shaft 65 rotates collars 70, and collars 70, through their drive pins 72, rotate the segments of screw elements 29 and 30.

As illustrated in FIG. 5, a second set of dough shields 78 are formed at end wall 19 at the opening 79 in end wall 19 through which the screw conveyor extends. The dough shields 78 are angled upwardly within hopper 12 and along the length of screw conveyor 28 and tend to guide the mass of dough in hopper 12 that is being induced to move with the dough in the threads of screw conveyor 28 to merge downwardly into the screw conveyor to compress the dough down into the screws to help pack the dough into the conveying pockets formed by the screws. This compressing action also acts to shear the dough in the conveying pockets from the dough mass above the conveyor screws so that the dough mass above the screws does not cling to the dough in the conveying pockets and does not tend to pull the dough out of the screws as the dough is moved into the discharge conduit. Also, dough shield 78 functions as a safety feature so that the operator, upon cleaning the equipment, etc., will not be likely to have his hand or other objects captured in the threads of the screw conveyor.

OPERATION

When the dough pump 10 is placed in operation, it is charged with a mass of dough that has been dumped from a mixer (not shown) into hopper 12. Motor 44, through the reduction gears 45, chain drive 51, jack shaft 54 and chain drive 58 drive screw conveyor 28 so that the upper surfaces of the screw elements 29 and 30 rotate toward each other. The helical knife edge 35 formed by the concave conveying surface 33 and the peripheral portion 32 of each helical screw element 29 and 30 tends to slice the dough at the bottom of hopper 22 away from the mass of dough in the hopper, and the concave conveying surfaces 33 urge the dough along the length of the bottom surface of the hopper toward discharge conduit 14. The slicing action of the screw conveyor tends to reduce the damage suffered by the dough from tearing the dough during the dispensing function and the dough is dispensed without a substantial amount of agitation.

The inward and downward rotational movements of the upper surfaces of the conveyor elements 29 and 30 in the bottom of dough hopper 12 tend to induce the dough to move inwardly from the sidewalls 20 and 21 of hopper 12 over the screw conveyor and then downwardly between the screw conveyor elements 29 and 30. This migration of the dough to a position over the screw conveyor tends to induce the dough to separate itself from the side walls 20 and 21, and the usual adherence of dough to the surfaces of the hopper is reduced so that little residue of dough remains in hopper 12 at the completion of the dispensing function.

As the dough moves with the screw conveyor 28 and enters discharge conduit 14, the threads 31 change in configuration. The threads in phase A are positive displacement threads and move the dough toward the discharge conduit 14 against the movement of air into dough shield 61, so that the dough drawn into the screw conveyor in phase A is moved along the hopper. The threads in phase B are reduced in diameter and tend to urge a smaller volume of the dough toward the discharge conduit, thus requiring a relatively small amount of power from the drive system. The threads in phases B and C have helical cutting edges which tend to slice through the dough for minimum damage of the dough. The interfitting arrangement of the threads of each screw element with the other screw element in phase D and the conforming shape of the discharge conduit 14 causes the screw elements to positively displace the dough through the discharge conduit 14. This effectively seals the dough in the helical spaces or conveying pockets 37 between the threads 31 of the screw elements so that small helical increments or batches of dough are sealed in the spaces 37 from the mass of dough in hopper 12. These small helical increments of dough are positively displaced through discharge conduit 14 toward the discharge opening 40 of discharge nozzle 15. As the dough moves through discharge conduit 14 it is worked and compressed, and gives up some of its gas. When the dough reaches the end of screw conveyor 28 adjacent discharge opening 40, pockets of air will have been formed in and about the dough, and vent opening 41 in discharge nozzle 15 permits the air to escape to conduit 42, and the escaping air together with any dough moving with it passes back to hopper 20. The smaller cross-sectional area of discharge opening 40 causes a back pressure to be exerted in the dough reaching nozzle 15, so that the air is forced out of vent opening 41 as the dough is compressed and extruded from discharge opening 40.

As the dough in the hopper feeds downwardly toward the screw elements the dough at the rear of the hopper fills in the spaces of the screw elements first, which results in the dough at the rear of the batch of dough in the hopper feeding to the conveyor first. After the dough has been received by the screw conveyor, the concave shapes of the conveying surfaces 33a of the screw elements tend to hold the dough in the screw conveyor. The rest of the dough in the hopper tends to form a tunnel over the screw elements and the dough being conveyed by the screw elements.

As illustrated in FIG. 8, a scrap chute 80 can be mounted over the rear of the screw elements at the rear of the hopper 12 adjacent end wall 18. Scrap chute 80 includes upright side walls 81 and 82 and end walls 83 and 84 and is open at its upper and lower ends. The lower end opening of scrap chute 80 is shaped at 86 to fit about the screw elements 29 and 30 so that the dough in the main portion of hopper 12 does not move into the portions of the screw elements beneath scrap chute 80. With this arrangement the scrap chute functions as an additive conduit in that additive material can be placed in scrap chute 80 and the additive material drops directly into the screw elements 29 and 30 and is conveyed by the screw elements out from beneath the scrap chute and through the dough hopper beneath the dough in the dough hopper and through the discharge conduit 14. The concave shape of the conveying surfaces 33a of the screw elements tend to hold the additive material in the confines of the helical screws 29 and 30 so that the additive material does not escape from the screws as it is moved beneath the batch of fresh dough in the hopper. Usually the rate at which the additive material is fed to the scrap chute 80 is substantially less than the capacity of the conveyor screws. This results in the additive material partially filling the conveyor screws and the fresh dough filling the rest of the spaces of the conveyor screws.

It will be understood that the foregoing relates only to preferred embodiments of the present invention, and that numerous changes and modifications may be made therein without departing from the spirit and scope of the invention as set forth in the following claims.

I claim:

1. A method of dispensing dough from the lower portion of a mass of dough comprising the steps of slicing dough from the lower portion of the mass of dough with a pair of interference helical screw elements each with a helical thread, with the thread of the first of said screw elements projecting into the spaces formed by the thread of the second of said screw elements, each thread of said screw elements including a conveying surface and an outer periphery, the conveying surfaces of the threads of the screw elements being concave and inclined at their peripheries toward a discharge conduit and intersecting the outer peripheries of the threads at a sharp acute angle to form a spiral cutting edge about each screw element; moving the dough with the conveying surfaces of the screw elements along a path and through a conduit; dividing the dough into batches as the dough is moved along the path; displacing each batch of dough through the conduit toward a discharge nozzle; and venting air from the dough as the dough approaches the discharge nozzle.

2. The method of claim 1 and further including the step of feeding additive material to the screw elements before the screw elements engage the mass of dough.

3. The method of claim 1 and further including the step of loading the mass of dough in a hopper having opposed converging side walls and a rectilinear horizontal conveyor cradle at its bottom portion, and wherein the step of slicing dough from the mass of dough comprises rotating the pair of screw elements located in the horizontal conveyor cradle in opposite directions with their upper surfaces moving toward each other and slicing with the screw elements into lower portion of the mass of dough in the hopper.

4. A method of dispensing dough from a mass of dough through a discharge conduit comprising the steps of feeding the mass of dough downwardly between converging side walls of a hopper to a rectilinear horizontal conveyor cradle, rotating a pair of parallel juxtaposed oppositely threaded interference helical screw conveyor elements each with a helical thread, the thread of each of the conveyor elements having a concave conveying surface and an outer periphery, the concave conveying surfaces being inclined at their peripheries toward the discharge conduit and intersecting the outer peripheries of the threads at a sharp acute angle to form a spiral cutting edge about each conveyor element in the conveyor cradle with their upper surfaces moving toward each other; slicing into the mass of dough with the spiral cutting edges of the conveyor elements to remove dough from the mass of dough; moving the dough with the conveying surfaces of the conveyor elements along the conveyor cradle and through a discharge conduit; and dispensing the dough through a discharge nozzle at the end of the discharge conduit.

5. The method of claim 4 and further including the step of removing air from about the dough as the dough is moved with the conveyor elements along the conveyor cradle.

* * * * *